United States Patent
Fan et al.

(10) Patent No.: US 8,086,040 B2
(45) Date of Patent: Dec. 27, 2011

(54) TEXT REPRESENTATION METHOD AND APPARATUS

(75) Inventors: Zhigang Fan, Webster, NY (US); Francis K. Tse, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 1055 days.

(21) Appl. No.: 11/950,883

(22) Filed: Dec. 5, 2007

(65) Prior Publication Data
US 2009/0148042 A1    Jun. 11, 2009

(51) Int. Cl.
*G06K 9/00* (2006.01)
(52) U.S. Cl. ........................ 382/180; 382/190
(58) Field of Classification Search .................. 382/180
See application file for complete search history.

(56) References Cited

U.S. PATENT DOCUMENTS

| | | | |
|---|---|---|---|
| 6,973,213 | B2 | 12/2005 | Fan et al. |
| 7,171,061 | B2 | 1/2007 | Sarkar et al. |
| 2004/0066538 | A1* | 4/2004 | Rozzi ............................ 358/2.1 |
| 2006/0262976 | A1* | 11/2006 | Hart et al. ..................... 382/190 |
| 2007/0237401 | A1* | 10/2007 | Coath et al. .................. 382/232 |

OTHER PUBLICATIONS

C.. Teh, R. Chin, A Scale-Independent Dominant Point Detection Algorithm, 1988 IEEE International Conference on CVPR, Jun. 5-9, Michigan, pp. 229-234.
F. Ono et al., JBIG2-The Ultimate Bi-Level Image Coding Standard, Proceedings, 2000 International Conference on Image Processing, vol. 1, Vancouver, BC, Canada, pp. 140-143.
R.C. Gonzalez et al., CC extraction, Digital Image Processing, Addison Wesley, 1992, pp. 42-43 and 532-534.
A. Rosenfeld, A. C. Kak, Digital Picture Processing, Academic Press, 1981, vol. 2, pp. 219-231.

* cited by examiner

*Primary Examiner* — Hadi Akhavannik
(74) *Attorney, Agent, or Firm* — Oliff & Berridge, PLC

(57) ABSTRACT

A text-like data representation technique and a text-like data representation apparatus are disclosed that may: acquire image data from a scanned image; segment text regions from the image data; further extract each connected component in the text regions; form clusters based on the connected components; group each connected component in the text regions into one of the clusters with similar or identical characters; generate a high-resolution representative for each cluster; generate a vector representation for each high-resolution representative; and code the text as text data by associating each connected component with its vectorized high-resolution representative, and location in the document.

17 Claims, 3 Drawing Sheets

TEXT REPRESENTATION METHOD AND APPARATUS

BACKGROUND

Paper documents may be scanned and text in the documents may be stored. Various techniques exist for representing the text in the scanned document. It is desirable improve the resolution and representation of the text in the scanned document and to reduce the file size.

SUMMARY

A text-like data representation technique and a text-like data representation device are disclosed that convert data from a scanned document into a format that has a higher resolution than the original resolution of the scanned document and has an efficient data coding that reduces file size. While the text-like data may be any text-like data, and not necessarily text data, the words text and text data will be used for ease of discussion, but may apply to any text-like data.

The technique and device may acquire image data from a scanned image and may segment text regions from the image data and further extract each character-like object (connected component) in the text regions. The technique and device may form clusters based on the object in the text regions and for grouping each object in the text regions into one of the clusters with similar or identical objects. Further, the technique and device may generate a high-resolution representative for each cluster so that each object in a given cluster may be represented by the high-resolution representative for that character's cluster. The technique and device may then generate a vector representation for each high-resolution representative and code the text as text data by associating each character of the text data with its vectorized high-resolution representative and location in the document.

The device may include an input interface for receiving the image data, a memory for storing instructions for the text representation technique, a controller for performing the text representation technique, a cluster storage for storing cluster information, specifically, for storing high-resolution cluster representatives, and an output interface for outputting a font and/or converted text data generated by performing the text representation technique.

EMBODIMENTS

Figure 1:
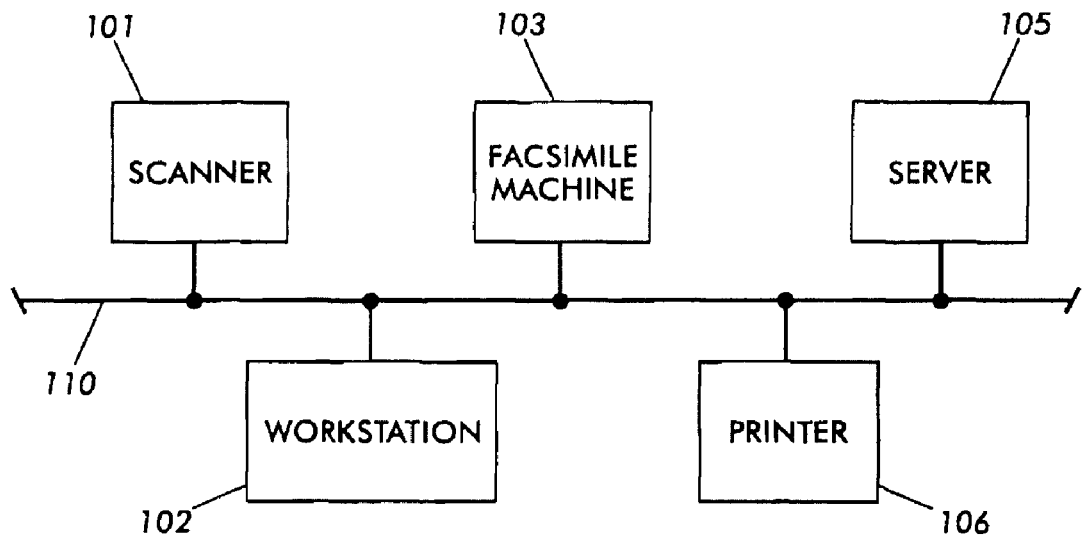
FIG. 1 shows an exemplary document processing system.

FIG. 1 shows an exemplary document processing system 100 including a scanner 101, a workstation 102, a facsimile machine 103, a server 105, and a printer 106 connected via network 110. Workstation 102 may be a PC, for example. Network 110 may be any type of network such as one or more wired, wireless, optical networks, etc. that may be part of a computer network, a LAN, any connection between two or more devices, or a connection between two or more portions of a single, multi-functional device, for example.

In document processing system 100, scanner 101 may scan a document for processing by a user on workstation 102, for example. When scanned, each character in the document may be represented by a bitmap. If this is the case, then the quality of the text in the scanned document is dependent on the resolution of the scanner. For example, text from a scanner scanning at 300 dots per inch (dpi) will have text quality far better than text from a scanner scanning at 150 dpi. A resolution conversion procedure may be required when the scanned text is outputted (printed or displayed) on a device with a resolution that is different from the scanning resolution. It may be difficult to convert text of low resolution to higher resolutions without sacrificing the boundary smoothness. Further text quality degradation may occur when the output resolution is not an n integer multiple of the scanning resolution, such as scanning at 150 dpi and printing at 400 dpi, for example. Consequently, the bitmap representation may introduce text image quality degradation and resolution dependency when they are outputted on devices of different resolutions.

In order to improve the text image quality and reduce resolution dependency, the scanned text bitmap may be converted into one or more curves (vectors) representing the shape of each of the scanned characters. Thus, rather than being represented by scanned bitmap, each character may be represented by a set of equations that define curves which fit the outlines of the character. With the vector representation, the text shape is not altered when the resolution is changed. The quality of vectorization depends on the quality of the input text. Noise in the input may provide false information to the vectorization process. Low resolution text input, which may lack information, such as serif shape and corner sharpness, may generate a blurred vector representation. Therefore, in the case of the vectors, it may be desirable to increase the resolution of the image data in order to provide a high-resolution text document and improve vectorization.

A text document may easily contain thousands of characters. To represent each character with a set of equations and store the information implies a large file size. A larger file size corresponds to longer data transmission times through document processing system 100. For example, if the user desires to print or send the documents by facsimile, it may take workstation 102 a long time to send the data to printer 106 or facsimile machine 103. Similarly, if the user saves the document in memory 102, the document may take up a large portion of the memory. Thus, it is often desirable to reduce the file size of the scanned document.

Figure 2:
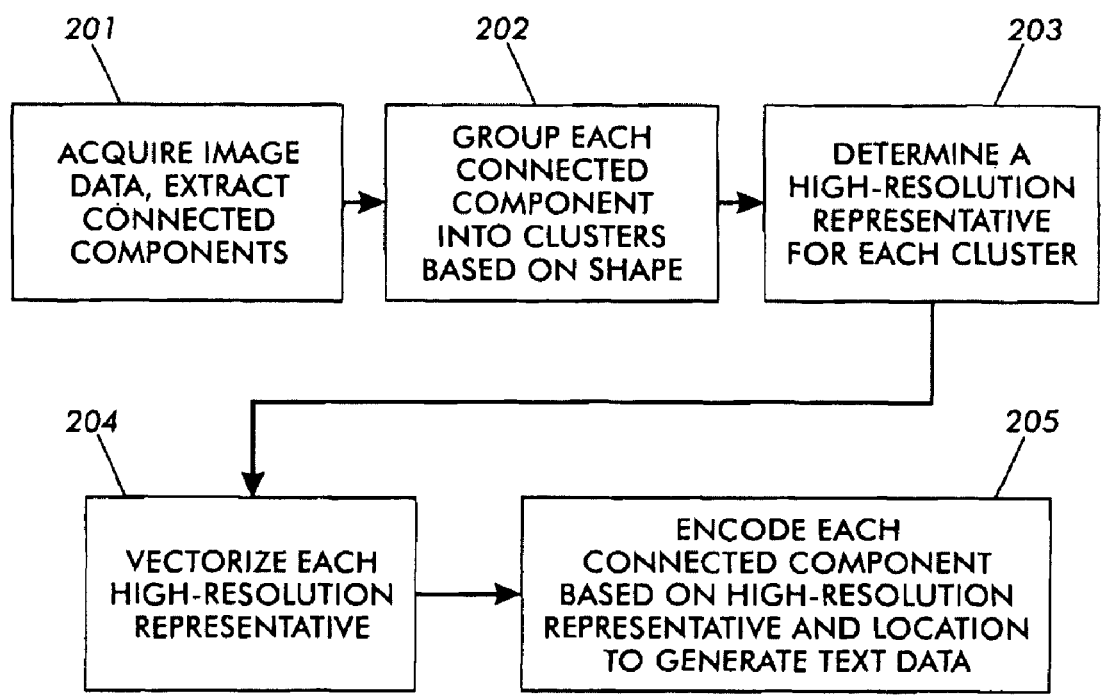
FIG. 2 shows an exemplary process flow diagram of a text data representation technique.

FIG. 2 shows a process flow diagram of a text data representation technique that converts image data of a scanned or otherwise acquired document that contains text into text data with its vector representation. In block 201, image data is acquired and each connected component is extracted from the image data. In block 202, clusters for connected components are formed, and each connected component is grouped with identical or similar-shaped connected components into one of the clusters in order to greatly reduce file size. In block 203, a high-resolution representative is determined for each cluster so that each connected component in a given cluster may be represented by the high-resolution representative for that connected component's clusters in block 204, a vector representation is determined for each high-resolution representative. In block 205, the text data is coded, whereby each connected component of the text data is represented by its high-resolution representative and location in the document.

In block 201, image data may be acquired by scanning a paper document using scanner 101, retrieving an image data file from memory 102, facsimile machine 103 or server 105, for example. For ease of discussion, the scanner example will be used. If this is the case, at block 201, workstation 102 may extract the characters from the scanned image.

In extracting the characters from the single image data, workstation 102 may perform binarization of the image data, which converts a multi-tone or color image into a binary image. For example, the multi-tone or color image data may be represented as a plurality of individual pixels each having a value of 0 or 1, where 0 may represent white and 1 may represent black. Each multi-tone or color pixel may be converted to binary by extracting a luminance value from the pixel and then comparing it to a certain threshold value. If the luminance value is greater than or equal to the threshold, the pixel may be set to 0 (white) and if the luminance value is less than the threshold, the pixel may be set to 1 (black), for example.

A coordinate system may be used to locate each individual pixel, so that each pixel corresponds to two coordinates, such as x and y, which may represent the number of pixels from the left and top of the scanned document, respectively, for example. In this way, the entire scanned image data may be represented by a plurality of pixels P(x,y)=0 or 1. Of course, any coordinate system may be used.

If the document is scanned by scanner 101, then the number of pixels on the page may be consistent with the resolution of the scanner. For example, if scanner 101 scans at 150 dots per inch (dpi), then the scanned image data may contain 150 pixels per inch.

After binarization, the scanned image may be segmented to separate image regions from text regions. Various methods used in OCR technologies for locating text regions within image data exist, such as, for example, background-based image segmentation, disclosed in U.S. Pat. No. 6,973,213 B2, which is incorporated herein by reference. In background-based image segmentation, an image may be broken up into different regions, each region being classified as either text or image data. If a region is determined to be composite (text and image data), that region may be further divided until the text part of the composite region can be extracted.

For each segmented text region, individual connected components (CC's) are extracted. A CC is a group of neighboring pixels that all have a value of 1. For example, a pixel may be another pixel's neighbor if it is one of the eight pixels surrounding that pixel. Thus, multiple connected components may be used to represent one letter or symbol. For example, the letter, "i" may be represented as two separate CC's, one for the bottom "line" and the other for the top "dot." On the other hand, in some cases, one CC may represent a combination of two or more letters. For example, in the word "flood," the letters "fl" may be one CC, since in some fonts the top of the "f" and the top of the "l" are connected.

In order to extract CC's, a binarized image may be scanned pixel by pixel from left to right and top to bottom. When the scan reaches a pixel that has a value of 1, it may determine that it is part of a CC. Similarly, if neighboring pixels also have a value of 1, they may be determined to be part of the same CC as the first pixel with a value of 1. If, during scanning, a pixel has a value of 1 that is not a neighbor of a previously scanned pixel with a value of 1, it may be determined to be a part of a new CC, for example. Thus, by determining all the neighboring pixels that have a value of 1, a CC may be determined. In this sense, a CC may take on a shape as determined by the values of the neighboring pixels. By scanning each pixel of the binarized image in the manner described above, each connected component in the binarized image may be determined and extracted.

In block 202, the extracted CC's are compared to one another and if two or more CC's have the same or similar shapes, they are grouped into one cluster. For example, two or more CC's representing "&" symbols may be grouped into one cluster. Each CC may be compared to another CC by calculating the total number of pixels that are different between the CC's and comparing the total number to a predetermined threshold, for example. The CC's may be aligned with each other so that the top left corners of each CC overlap, or so as to minimize the total number of pixels that are different between the two CC's, for example. The threshold may be entered by a user, or preset, based on a desired accuracy. Similarly, the threshold value may be a percentage of the total number of pixels in each CC, such as, for example, 95% of the pixels must match in order to group the two CC's together.

As an example, suppose the CC's in a scanned word, "apple" are to be clustered. Since "a" is the first letter, no other Clusters may exist, so "a" is placed into cluster 1. Furthermore, the scanned "a" may be chosen as a representative character for cluster 1. The first "p," in the word apple is the next CC, and it is compared to the representative character for cluster 1, "a". However, when comparing "a" to the first "p", the number of pixels that are different between the CC's may exceed the threshold value. In this case, cluster 2 is created, and the first "p" may be the representative for cluster 2. The second "p" in "apple" may be compared to the representatives for clusters 1 and 2. When comparing the second "p" to the representative for cluster 2, which in this case may be the first "p", it may be determined that the number of different pixels between the first "p" and the second "p" may be within the predetermined threshold, and the second "p" may be grouped into cluster 2. Similarly, "l" and "e" may be compared to the existing clusters, and may be grouped into clusters 3 and 4, respectively.

The following is an exemplary pseudo-code for the clustering technique described above:
1. Set number of clusters=0;
2. For each connected component $CC_k$, where $CC_k$ denotes the k-th CC in the document, perform steps 3-6;
3. For each cluster n, perform steps 4-5;
4. Compare $CC_k$ and representative shape of cluster n;
5. If $CC_k$ matches representative, $CC_k$ is assigned to cluster n, and go to step 2;
6. If $CC_k$ does not match any existing cluster, create a new cluster, increase number of clusters by 1, and assign $CC_k$ to the newly created cluster.

This process is repeated for each CC, until all CC's are grouped into a cluster. As mentioned earlier, a character in the cluster may be chosen as a representative of the cluster. However, in block 203, a high-resolution representative may be generated for each cluster from two or more of the CC's in the cluster.

To generate the high-resolution representative, a gray-tone average image may be generated from the two or more of the CC's. The CC's may be shifted or offset from each other, due to scanning differences or scanning defects, such as dust or stray markings on the document, for example. To correct this, the CC's may be aligned so as to minimize the difference between pixel values. For example, a correlation may be performed between two or more CC's in order to maximize the number of corresponding pixels with the same pixel value. The pixel values of each pixel of the aligned CC's may then be averaged according to the following formula:

$$A(m,n)=\Sigma_k CC_k(m,n)/N, \qquad (1)$$

where A(m,n) is the average pixel value of the CC at (m,n), $CC_k$ is the k-th CC used in the averaging, and N is the number of CC's used for the averaging. Since $CC_k$(m,n), as mentioned earlier, is binary (0 or 1), it follows that $0 \leq A(m,n) \leq 1$.

By averaging a set of similar images, the amount of noise due to printing, scanning and other defects may be reduced. In other words, the signal-to-noise ratio (SNR) of the gray tone average image may be higher than that of the individual characters. The higher SNR may result in more accurate images, which may result in more accurate vectorization, for example. Further, a high-resolution image may be obtained by extracting the signal from the gray-tone average image using the gray scale values of each pixel A(m,n).

For example, each pixel (m,n) in the average image may be replaced with four high-resolution binary pixels (2m, 2n), (2m, 2n+1), (2m+1, 2n) and (2m+1, 2n+1), which are set to 0 or 1 based on both the value of A(m,n) and the values of neighbors of A(m,n). By replacing each (m,n) with four high-resolution binary pixels, a high-resolution representative image is generated. The value of A(m,n) may be divided into 5 ranges in order to determine the number of high-resolution binary pixels that will be set to 1.

For A(m,n)<0.2, all four high-resolution binary pixels may be set to 0.

Figure 3:
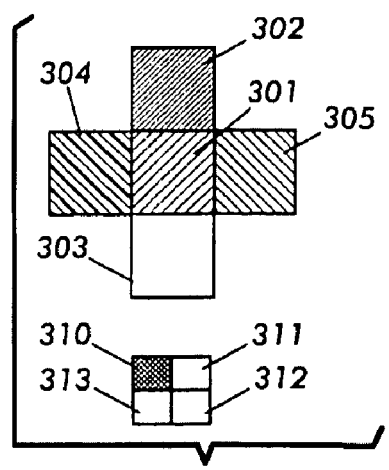
FIGS. 3 and 4 show an exemplary high-resolution image generation technique.

For $0.2 \leq A(m,n) < 0.4$, one of the pixels may be set to 1 and the other three set to 0. The position of the pixel to be set to 1 may be determined based on averaged image values of four neighboring pixels of A(m,n). For example, FIG. 3 shows an exemplary average pixel 301 which is denoted as A(m,n) and its four neighbors, 302-305, which may be defined as A(m, n−1), A(m, n+1), A(m−1, n) and A(m+1, n), respectively. Also in FIG. 3 are four high-resolution binary pixels 310-313, that may replace A(m,n) in the high-resolution representative image, as mentioned above. These four high-resolution binary pixels may be defined as (2m, 2n), (2m−1, 2n), (2m+1, 2n+1) and (2m, 2n+1), respectively. The one pixel of the four high-resolution binary pixels to be set to 1 is determined based on the following averaged values:

B(tl)=A(m,n−1)+A(m−1,n); i.e. the sum of the top and left neighbors

B(tr)=A(m,n−1)+A(m+1,n); i.e. the sum of the top and right neighbors

B(bl)=A(m,n+1)+A(m−1,n); i.e. the sum of the bottom and left neighbors

B(br)=A(m,n+1)+A(m+1,n); i.e. the sum of the bottom and right neighbors

B(tl) corresponds to high-resolution binary pixel 310, which is the top left pixel of the four high-resolution binary pixels; B(tr) corresponds to high-resolution binary pixel 311, which is the top right pixel; B(bl) corresponds to high-resolution binary pixel 312, which is the bottom left pixel; and B(br) corresponds to high-resolution binary pixel 313, which is the bottom right pixel. The high-resolution binary pixel with the highest corresponding averaged value out of B(tl), B(tr), B(bl) and B(br) is the pixel that is set to 1. The remaining three are set to 0. As shown in FIG. 3, 302 and 304 are the two darkest averaged pixels, and thus, B(tl) would have the highest value. Accordingly, 310 is set to 1 and 311-313 are set to 0.

Figure 4:
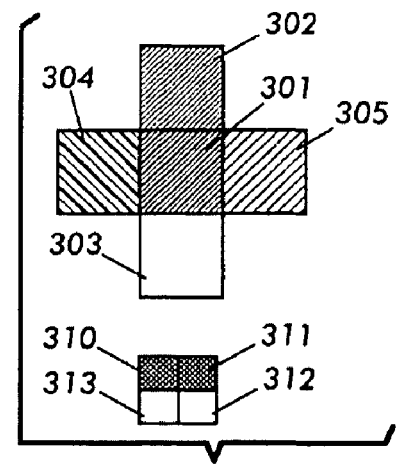

For $0.4 \leq A(m,n) < 0.6$, two of the pixels are set to 1 and the other two are set to 0. FIG. 4 shows an example for this A(m,n) range. The two pixels are determined by the following conditions:

a) if top neighbor 302 has the highest average value among all foul-neighbors, then the upper two pixels 310 and 311 are set to 1;
b) if bottom neighbor 303 has the highest average value among all four neighbors, then the lower two pixels 312 and 313 are set to 1;
c) if left neighbor 304 has the highest average value among all four neighbors, then the left two pixels 310 and 313 are set to 1; and
d) if right neighbor 305 has the highest average value among all four neighbors 311 and 312, then the right two pixels are set to 1.

For $0.6 \leq A(m,n) < 0.8$, one of the pixels is set to 0 and the other three are set to 1. The position of the 0 pixel is the high-resolution pixel with the lowest corresponding averaged value of B(tl), B(tr), B(bl) and B(br), as calculated above.

For $0.8 \leq A(m,n)$, all four pixels are set to 1.

A high-resolution representative image may be generated for each cluster using the above technique. The high-resolution representative image may have a resolution that is greater than the resolution of the individual CC's in the cluster, since four pixels are generated in the high-resolution representative image for each pixel in the representative image. For example, if scanner 101 is only capable of scanning at a resolution of 150 dpi, then a high-resolution representative image for each cluster may be 300 dpi.

The high-resolution representative image for each cluster is then vectorized at block 204. Vectorization accuracy may be improved by vectorizing the representative rather than the individual CC's because of the above-described reduced noise and higher resolution. To vectorize the high-resolution representative image, the outline or border of the image may first be determined. For example, each high-resolution representative image may be scanned pixel by pixel, left to right, top to bottom for pixel value transitions from 1 to 0 or 0 to 1.

Once the outline of the high-resolution representative image has been determined, the image may be vectorized using dominant point detection and curve-fitting, for example. A dominant point may be defined as a point along the outline where the outline exhibits maximum curvature, for example. Thus, a dominant point may be a maximum, minimum, or point of inflection of a curve along an outline.

Figure 5:
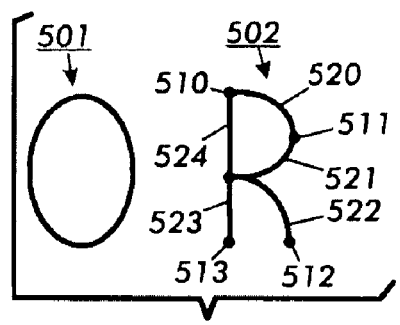
FIG. 5 shows two exemplary vectorized high-resolution representatives.

As an example of dominant point detection and curve fitting, FIG. 5 shows two exemplary high-resolution representative images 501 and 502 that may be vectorized, representing an "O" and an "R," respectively. The "O" image may be represented by two curves, such as ellipses, one for the inner boundary, and one for the outer boundary, for example, and may not contain any dominant points. On the other hand, more curves may be used to describe the "R". In this case, one or more dominant points, such as the 5 dominant points 510-514 shown in FIG. 5 may be identified and 4 curves 520-523 may be determined between dominant points 510-514. The following is an exemplary pseudo code for the vectorization technique performed on each high-resolution representative image as described above:

1. determine the outline of the high-resolution representative image;
2. if a curve fits the outline, record the curve, and set the number of dominant points, dp=0;
3. if no curve fits, then find two dominant points and set dp=2;
4. find curves that fit between the dominant points;
5. if curves cannot be found to fit, find one more dominant point, set dp=dp+1 and go to step 4;
6. record the curves and the locations of the dominant points.

The above-described technique may be performed for each high-resolution representative, so that each cluster may be vectorized.

In block 205, the text data is coded with its vector representation. In this way, a font corresponding to the font of the scanned document is defined, with each character of the font being represented by a set of curves (vector) corresponding to a cluster. Each individual character in the document may be represented by its cluster number (which corresponds to a vectorized high-resolution representative), and its location in the document. By encoding all of the characters in the text data contained in the document, the text data may be represented as high-resolution data using a small file size.

Figure 6:
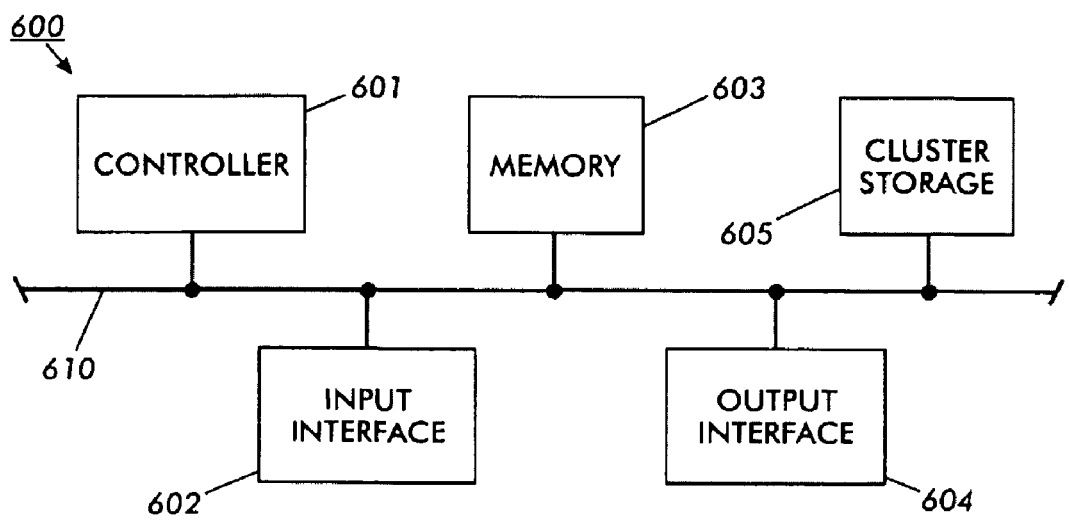
FIG. 6 shows an exemplary text representation system.

FIG. 6 shows an exemplary text representation system 600 including controller 601, input interface 602, memory 603, output interface 604, and cluster storage 605. The above components may be coupled together by bus 610. While, as an example, system 600 is illustrated using a bus architecture, any other type of convenient architecture may be used. Additionally, components 601-602 and 604 may be implemented using any of a variety of technologies such as PLI, PAL, application specific integrated circuits (ASICs), off the shelf components, etc. Controller 601 may be implemented in hardware by a general purpose processor or a special purpose processor or may be implemented by software in one or more processors. Memory 603 and high-resolution representative 605 may be hard disk, RAM, ROM, flash memories, bubble memories, etc. Additionally, high-resolution representative storage 605 may be memory 603. Input and output interfaces 602 and 604, respectively, may be any type of interface such as network interfaces using wired, wireless, optical, etc. technologies, internal device interfaces, etc. These interfaces may implement standard protocols such as TCP/LP, USB, IEEE 1394, etc.

Text representation system 600 may be included in a document processing system such as, for example, document processing system 100. Text representation system 600 may be included in any of the devices of document processing system 100, such as workstation 102, for example.

Input interface 602 may receive image data from a peripheral device or memory, such as a scanner or from a server via a network, and send the data to controller 601. Text regions within the image data may already be segmented, and CC's may already be extracted from the text regions. However, if this is not the case, controller 601 may perform text segmentation and CC extraction in accordance with instructions, which may be saved in memory 603, for example.

Once the CC's are extracted from the text regions, controller 601 groups similar or same CC's together into clusters. For each CC, controller 601 may compare the CC to a representative for each cluster until the CC matches the representative within a predetermined threshold. If controller 601 compares a CC to each cluster representative and still does not find a match, controller 601 may create a new cluster, with the CC as the representative for that cluster. This new cluster may be saved at cluster storage 605, for example.

Controller 601 compares CC's to the representatives for each cluster until each CC in the text has been grouped into a cluster. Each cluster and the groups of CC's that it contains may be stored at cluster storage 605, for example.

Controller 601 may use the information storage at cluster storage 605 to generate a high-resolution representative for each cluster, in accordance with the technique described in regards to FIGS. 3 and 4, for example. Controller 601 may also vectorized each high-resolution representative using dominant points and curve fitting, as discussed in regards to FIG. 5.

Controller 601 may generate a font containing all the vectorized high-resolution representatives, and then encode the text in the image data that was received via input interface 602 as text data, using the font. For example, controller 601 may represent each individual CC in the text data based on its cluster number, and location in the document. This encoded text data may be stored in memory 603, or output to a peripheral device via output interface 604, such as a printer, user interface or external memory, for example, for processing or storage.

Figure 7:
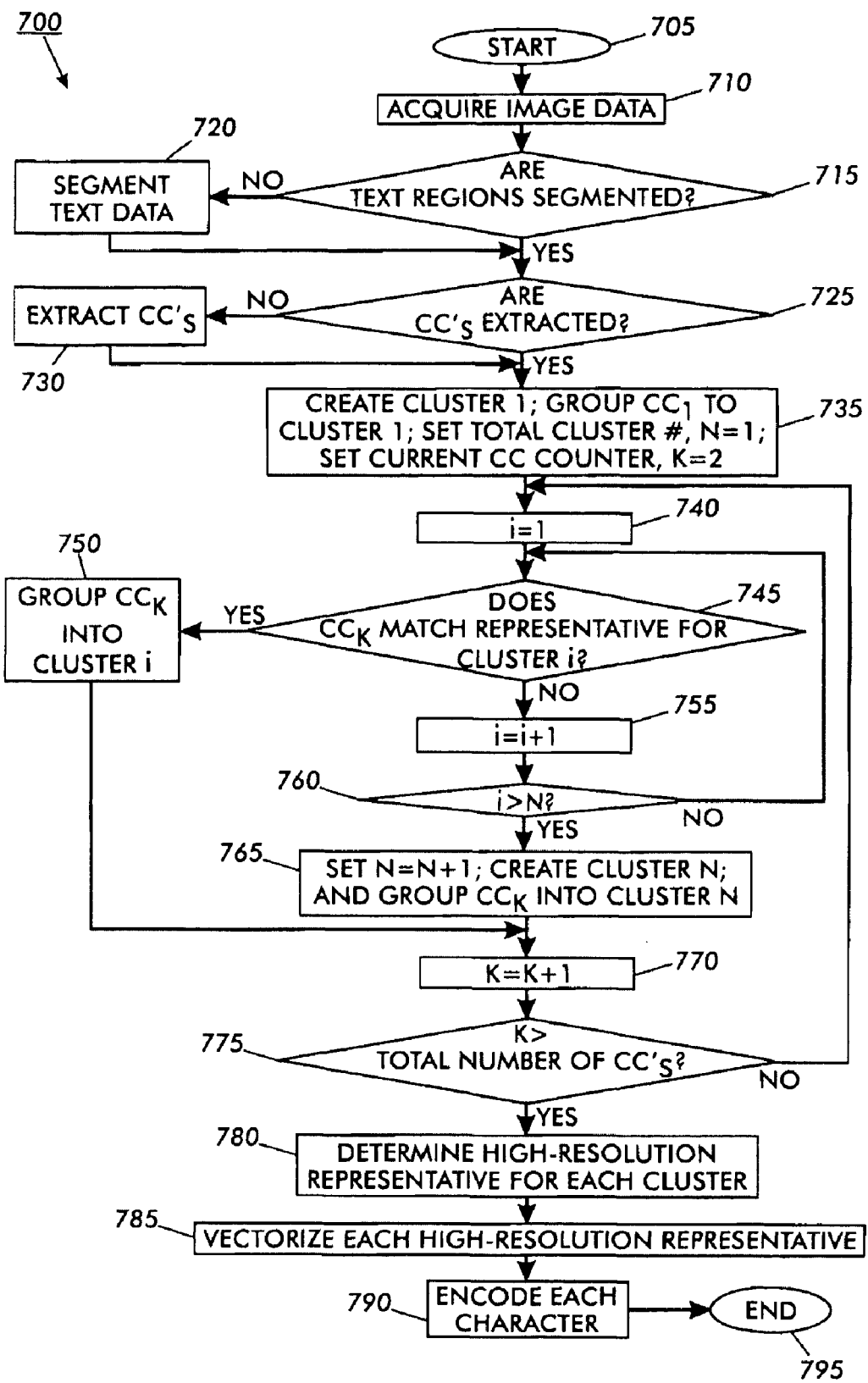
FIG. 7 shows an exemplary process for the text representation system.

FIG. 7 shows an exemplary process 700 performed by text representation system 600. In step 710, the process acquires image data and goes to step 715. In step 715, the process determines if the text regions are segmented in the received image data. If segmented, the process goes to step 725, otherwise the process goes to step 720. At step 720, the process segments the text to determine which regions of the image data contain text and the process goes to step 725.

At step 725, the process determines if the CC's (characters) in the segmented text regions are extracted. If the CC's are extracted, the process goes to step 735, and if not extracted, the process goes to step 730. At step 730, the CC's are extracted from the text regions and the process goes to step 735.

At step 735, cluster 1 is created, $CC_k$ is grouped into cluster 1, the total cluster counter, N, is set equal to 1, and the current CC counter, k, is set equal to 2. The process goes to step 740, where the current cluster counter, i, is set equal to 1, and the process goes to step 745.

At step 745, the process determines if the current connected component, $CC_k$, matches a representative for cluster i. If $CC_k$ matches the representative for cluster i, the process goes to step 750, where $CC_k$ is grouped into cluster i and the process goes to step 770. If, at step 745, the process determines that $CC_k$ does not match the representative for cluster i, the process goes to step 755 where i is incremented (so that $CC_k$ may be compared to the next cluster representative) and the process goes to step 760 where, if i is not greater than N (if there are still cluster representatives remaining that have not been compared) the process returns to step 745 for the next cluster representative. If, at step 760 the process determines that i>N, which would mean that the current connected component, $CC_k$ has been compared to all available cluster representatives, then the process goes to step 765, where the total number of clusters, N, is incremented and $CC_k$ is grouped into the newly created cluster. The process goes to step 770.

At step 770, which is reached from either step 750 or step 765, as described above, where k is incremented, and the process goes to step 775, where the process determines if k>than the total number of CC's. If, at step 775, the process determines that k is not greater than the total member of CC's, then the process returns to step 740 for the next CC. If, at step 775, the process determines that k>the total number of CC's, the process goes to step 780. At step 780, the process determines a high-resolution representative for each cluster, and the process goes to step 785. At step 785, the process vectorizes each high-resolution representative and the process goes to step 790. At step 790, each character is encoded based on its cluster number in the font and location in the document, and the process ends at step 795.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A method for representing text-like data in an image comprising:
  acquiring image data at a first resolution;
  extracting text-like data from the image data;
  grouping each connected component of the text-like data into one or more clusters;
  generating a high-resolution representative character for each cluster that has a second resolution greater than the first resolution, wherein
    the high-resolution representative character for each cluster is determined based on aligning two or more of the connected components that are grouped in the cluster and determining average pixel values for each pixel of the connected components, and
    generating the high-resolution representative character comprises:
      generating an averaged image having averaged pixels, a value of each averaged pixel being determined by averaging values of corresponding pixels from the two or more of the connected components; and
      for each averaged pixel:
        generating high-resolution pixels; and
        determining values for each of the high-resolution pixels based on a value of the averaged pixel and values of neighboring averaged pixels;
  vectorizing the generated high-resolution representative character to generate a vectorized representative character; and
  representing each character of the text-like data based on the vectorized high-resolution representative character and a location of the character in the image.

2. The method of claim 1, the acquiring comprising:
  converting image data into binary image data;
  locating regions of the image data containing text-like connected components as text regions; and
  extracting the connected components from the text regions as the text-like data.

3. The method of claim 2,
  wherein four high-resolution pixels are generated for each averaged pixel, and the values for each of the four high-resolution pixels are based on the values of four neighboring averaged pixels.

4. The method of claim 1, wherein
  the high-resolution representative character for each cluster is one of the connected components that is grouped in the cluster.

5. The method of claim 1, the grouping further comprising, for each connected component:
  calculating a number of pixels for which the connected component and a representative character of a cluster have same values;
  comparing the number of pixels to a threshold value;
  grouping the connected component in the cluster if the number of pixels is greater than or equal to the threshold value; and
  not grouping the connected component in the cluster if the number of pixels is less than the threshold value.

6. The method of claim 5, the vectorizing being based on dominant points and curves connecting the dominant points.

7. An apparatus for representing text-like data in an image, comprising:
  an input interface capable of acquiring image data at a first resolution; and
  a controller, the controller configured to perform:
  extracting text-like data from the image data;
  grouping each connected component of the text-like data into one or more clusters;
  generating a high-resolution representative character for each cluster that has a second resolution greater than the first resolution, wherein
    the high-resolution representative character for each cluster is determined based on aligning two or more of the connected components that are grouped in the cluster and determining average pixel values for each pixel of the connected components, and
    generating the high-resolution representative character comprises:
      generating an averaged image having averaged pixels, a value of each averaged pixel being determined by averaging values of corresponding pixels from the two or more of the connected components; and
      for each averaged pixel:
        generating high-resolution pixels; and
        determining values for each of the high-resolution pixels based on a value of the averaged pixel and values of neighboring averaged pixels;
  vectorizing the generated high-resolution representative character to generate a vectorized representative character; and
  representing each character of the text-like data based on the vectorized representative character and a location of the character in the image.

8. The apparatus of claim 7, the controller further configured to perform:
  converting image data into binary image data;
  locating regions of the image data containing text-like connected components as text regions; and
  extracting the connected components from the text regions as the text-like data.

9. The apparatus of claim 8,
  wherein four high-resolution pixels are generated for each averaged pixel, and the values for each of the four high-resolution pixels are based on the values of four neighboring averaged pixels.

10. The apparatus of claim 7, wherein
  the high-resolution representative character for each cluster is one of the connected components that is grouped in the cluster.

11. The apparatus of claim 7, the controller, for each connected component:
  calculating a number of pixels for which the connected component and a representative character of a cluster have same values;
  comparing the number of pixels to a threshold value;
  grouping the connected component in the cluster if the number of pixels is greater than or equal to the threshold value; and
  not grouping the connected component in the cluster if the number of pixels is less than the threshold value.

12. The apparatus of claim 11, wherein the vectorizing is based on dominant points and curves connecting the dominant points.

13. A xerographic device incorporating the apparatus of claim 7.

14. The apparatus of claim 7, further comprising:
  means for acquiring the image data at the first resolution;
  means for grouping each connected component of the text-like data into the one or more clusters;

means for generating the high-resolution representative character that has the second resolution greater than the first resolution; then means for vectorizing the generated high-resolution representative character for each cluster to generate a vectorized representative character; and means for representing each character of the text-like data based on the vectorized representative character and a location of the character in the image.

15. A non-transitory computer-readable medium storing a computer program, the computer program allowing a computer to perform:

acquiring image data at a first resolution;

extracting text-like data from the image data;

grouping each connected component of the text-like data into one or more clusters;

generating a high-resolution representative character for each cluster that has a second resolution greater than the first resolution, wherein the high-resolution representative character for each cluster is determined based on aligning two or more of the connected components that are grouped in the cluster and determining average pixel values for each pixel of the connected components, and generating the high-resolution representative character comprises:

generating an averaged image having averaged pixels, a value of each averaged pixel being determined by averaging values of corresponding pixels from the two or more of the connected components; and for each averaged pixel:

generating high-resolution pixels; and determining values for each of the high-resolution pixels based on a value of the averaged pixel and values of neighboring averaged pixels;

vectorizing the generated high-resolution representative character to generate a vectorized representative character; and representing each character of the text-like data based on the vectorized representative character and a location of the character in the image.

16. The non-transitory computer-readable medium of claim 15, wherein four high-resolution pixels are generated for each averaged pixel, and the values for each of the four high-resolution pixels are based on the values of four neighboring averaged pixels.

17. The non-transitory computer-readable medium of claim 16, wherein for each connected component, the computer program allows the computer to perform:

calculating a number of pixels for which the connected component and a representative character of a cluster have same values;

comparing the number of pixels to a threshold value;

grouping the connected component in the cluster in the number of pixels is greater than or equal to the threshold value; and not group the connected component in the cluster if the number of pixels is less than the threshold value.

\* \* \* \* \*